R. JAEKEL & F. TIGGES.
Machines for Manufacturing Leather-Cloth, Imitation Silk-Damask, and similar Materials.
No. 220,383. Patented Oct. 7, 1879.

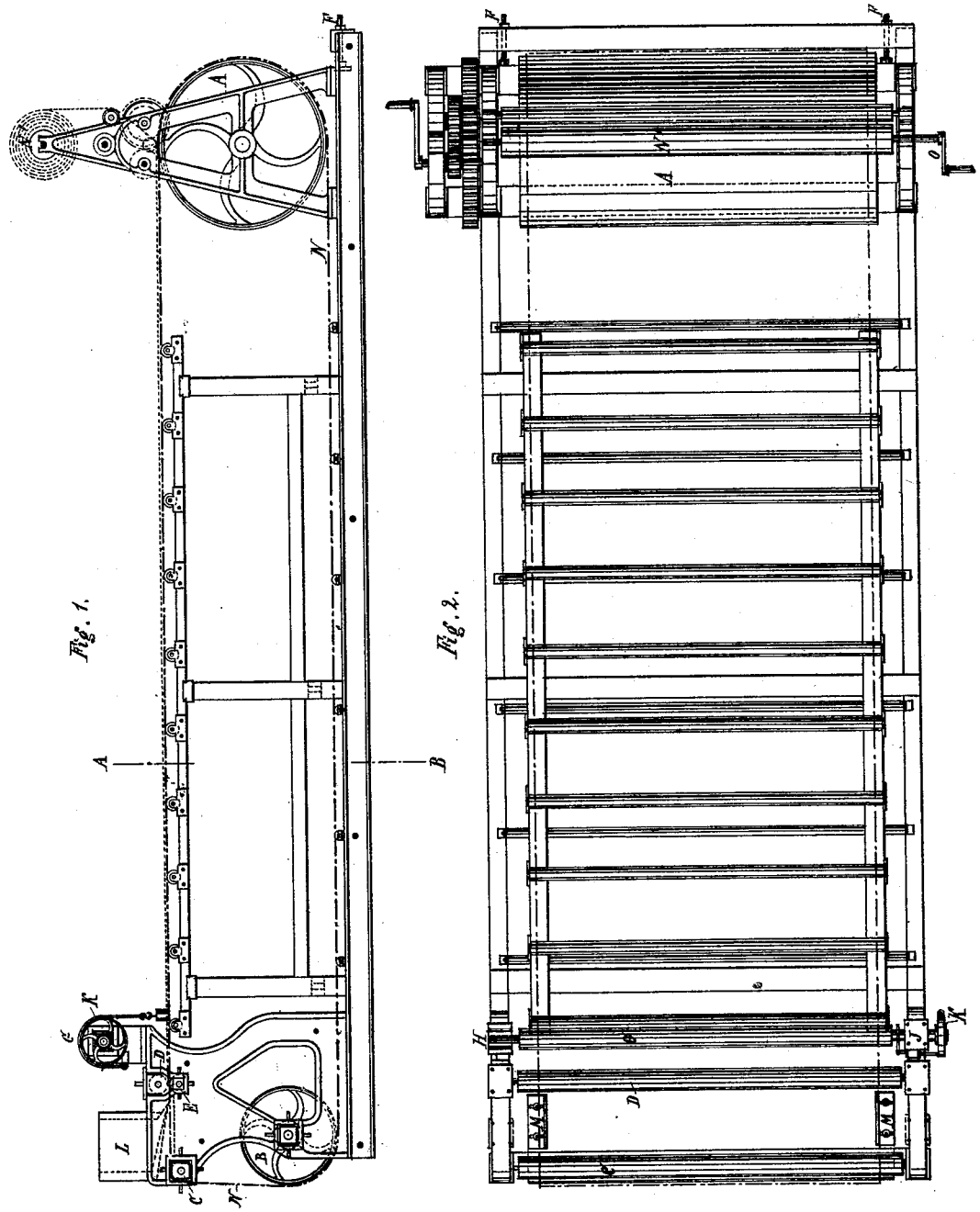

Witnesses –
Martin Farmer.
A Scott

Inventors
Richard Jaekel and Franz Tigges
per A Schücking
Attorney

UNITED STATES PATENT OFFICE.

RICHARD JAEKEL AND FRANZ TIGGES, OF BERLIN, PRUSSIA.

IMPROVEMENT IN MACHINES FOR MANUFACTURING LEATHER-CLOTH, IMITATION SILK DAMASKS, AND SIMILAR MATERIALS.

Specification forming part of Letters Patent No. 220,383, dated October 7, 1879; application filed June 25, 1878; patented in Germany, February 19, 1878.

*To all whom it may concern:*

Be it known that we, RICHARD JAEKEL and FRANZ TIGGES, of the city of Berlin, Prussia, have invented a certain new and Improved Machine for Manufacturing Leather-Cloth, Imitation Silk Damasks, and other Similar Materials, of which the following is a specification.

The object of the present invention is to furnish a novel machine for manufacturing leather-cloth and imitation silk damask, and the like, these articles being prepared by coating textile fabrics with pigments, oils, and resins, so as to impart a water-proof character to the finished product.

The invention consists in an apparatus or machine comprising a series of rollers and drums for receiving an endless revolving pattern-apron, a pair of rollers for receiving the fabric to be coated, and a heater and reservoir for the substances used for coating the fabric, as will be hereinafter more fully described.

Figure 3:
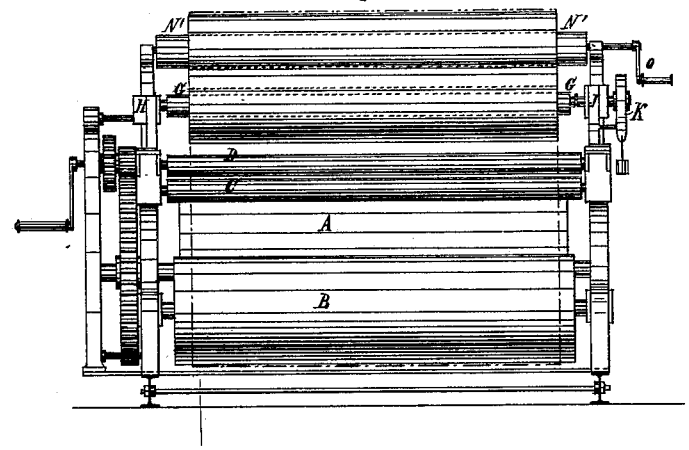
Figure 4:
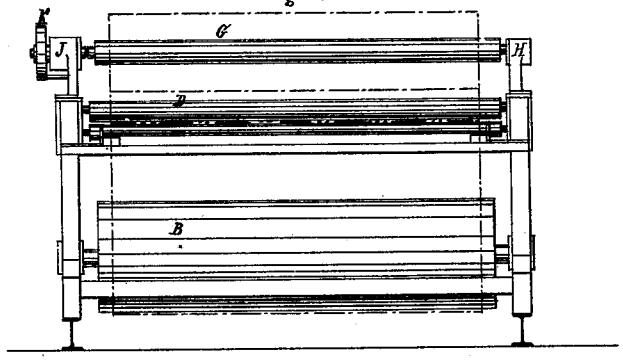

In the accompanying drawings, forming part of this specification, Figure 1 is a side elevation of a machine constructed according to our invention. Fig. 2 is a plan or top view of the same. Fig. 3 is an end elevation, and Fig. 4 is a transverse section through the line A B of Fig. 1.

The standards of the machine rest on two longitudinal bearing-rails, and the main or end standards support the smooth-faced drums A B, around which passes an endless apron, N, having a suitable design or pattern formed thereon, in the manner hereinafter described.

The pattern-apron also passes around a guide-roller, C, and between two pressure-rollers, D E, which rollers are all located at one end of the machine. The bearings or boxes of the pressure-roller D are, in the present instance, made adjustable by means of screws, so as to vary the pressure of said roller upon the pattern-apron and fabric passing under the same.

The supporting-standards of the drum A are made longitudinally adjustable upon the base-sills or bearing-rails, so as to enable the pattern-apron to be made taut upon its supporting-drums. This adjustment of the end standards is effected by mounting the same on slotted plates capable of being moved by the screws F. Between the drum A and the main standards of the machine are located a series of transverse rollers, forming a supporting-bed for the endless apron, in order to facilitate the movement of the latter.

A metallic plate may be arranged between the rollers C E, said plate being located under the apron, so as to form a rigid support for the same and prevent it from bending. The fabric to be treated is wound upon a roller, G, which is loosely fitted in bearings H J of the main standards of the machine, so as to be readily removed. One end of the roller G may be provided with a brake or tension device, consisting of a disk and an encircling spring-band carrying a weight. By means of this device the unwinding of the fabric is regulated and the proper tension of the same maintained.

The letter L denotes a kettle or heater made nearly as wide as the machine, and provided with double walls, so as to enable it to be heated by hot water or steam circulating between said double walls. Said kettle is designed to receive the plastic mass which is to serve as the covering of the textile fabric passing from the roller G between the rollers D E.

At the bottom of the kettle or heater may be located adjustable slides or plates M, which regulate the lateral flow of the mass contained in said kettle.

The discharge-mouth of the kettle is located in juxtaposition to the space between the rollers D E, so that the mass as it issues from the kettle is conducted between the fabric to be coated and the pattern-apron, is uniformly distributed, and then and there receives the impression or design from the pattern-apron.

During the passage of the fabric from the pressing-rollers toward the drum A the mass applied to said fabric is cooled, and then the product is wound upon a roller, N', turned by a crank, and subsequently it is hung up in a drying-room.

The plastic mass applied to textile fabrics in the manner above described is composed of a mixture of glue, a suitable pigment, glycerine, linseed-oil, soap, gallus Aleppo, and chromic acid, (acidum chromicum.)

The pattern-apron used by us is prepared in the following manner, to wit: A piece of leather or silken damask forming the original of the pattern, is taken and passed with the apron which is to receive the pattern in a negative form, around the system of rollers A B C E. The piece of leather or other material forming the original then receives a light coating of oil, in order to better free the plastic mass at a subsequent step of the process. The kettle L contains a mass consisting of a mixture of glue, glycerine, and vinegar. This mass is conducted from the kettle and applied the same manner as in the process of preparing the fabric above described. The pattern, however, cannot be removed from the original until the elapse of twenty-four hours. The prepared surface of the pattern-apron is then hardened or vulcanized by treating it with liquor ferro acetici, which leaves said surface ready for immediate use.

Having thus described our invention, what we claim as new, and desire to secure by Letters Patent, is—

In a machine for manufacturing leather-cloth and silk damask, the combination of a traveling pattern-apron, guide-drums for the latter, pressure-rollers, winding and unwinding rollers for the fabric to be treated, and a kettle or heater for the plastic mass to be applied to said fabric, substantially as and for the purpose set forth.

In testimony whereof we have signed our names to this specification in the presence of two subscribing witnesses.

RICHARD JAEKEL.
FRANZ TIGGES.

Witnesses:
WENCESLAUS V. NAWROCKI,
EDWARD P. MACLEAN.